United States Patent Office 3,621,556
Patented Nov. 23, 1971

3,621,556
FEEDING AND EJECTING DEVICE
Michel Thierri and Pierre Toussaint, Amiens, Somme, France, assignors to U.S. Philips Corporation, New York, N.Y.
Filed Dec. 16, 1969, Ser. No. 885,540
Claims priority, application France, Dec. 20, 1968, 179,502
Int. Cl. H01r 3/00; H05k 3/04
U.S. Cl. 29—203 D
12 Claims

ABSTRACT OF THE DISCLOSURE

A method and device for feeding an object to be worked on from a first working position to a second working position by advancing the object by means of an endless conveyor belt of variable speed to a position directly in front of the second working position including a guide member for guiding the object to the desired position and a brake member arranged at the end of the conveyor belt for cooperation with the guide member so as to accurately set the object in the proper position. A clamping member for tightly holding the object after the brake member has been released is actuated by a hydraulic press and after the object has been worked on the object is ejected from the position by a compressed air nozzle having a length adaptable to the length of wire.

The invention relates to a method and a device for feeding and ejecting an object to be worked on.

In automatic machine tools which perform a comparatively large number of operations on the same workpiece, devices permitting the feeding of workpieces in accurately defined positions are known. These devices are often adapted to the type of workpiece and to the operations concerned and if the machine carries out a consecutive number of operations each working position comprises a distributor and an ejecting member. These can either operate independently of each other or co-operate with each other.

In machines for stripping electric wires, for examle, these devices are generally formed by catches which convey the wire with a given cycle in accordance with the desired lengths of wire. After cutting to length and after stripping, a flow of compressed air acts upon one of the stripped parts for ejecting the length of wire. Positioning is not the prime concern here, rather it is the measurement of length. The catches draw a given length of wire across a cutting head having three cutters. The central cutter cuts the wire to the desired length and the two side cutters cut loose the insulating sheath.

The accurate length of the stripped length of wire is obtained once and for all by the adjustment of the side cutters relative to the central cutter.

Such a machine would be quite useless for stripping lengths of wire already cut, and a setting device of the kind set forth cannot be employed on a further machine.

The method and the device according to the invention provides for the feeding of objects, and particularly lengths of wire to be machined or otherwise worked on in a completely defined position. The distance between a first machine performing a first operation and a second machine performing a different operation may be of any value.

A built-in ejection system releases the feeding device and the working top of the machine for receiving the next workpiece. The ejection is performed so that the worked on pieces are suitably arranged in a trough provided for this purpose.

The feeding and ejecting method for a piece to be worked on in accordance with the invention, in which the transfer is performed by a conveyor belt and the ejection is obtained from appropriate means, is characterized in that the transfer of the piece from a first working position to a second working position is performed by a conveyor belt which is continuously driven at an adjustable speed. The piece is fed to the second working position by means of a movable guide. By means of the guide and brakehead, the piece is controllably braked so that it occupies an accurately defined position for machining or shaping, while the piece is simultaneously held tight. After the guide and brake is removed and piece lowered to the tool, it is ejected as soon as it is no longer held so that the tool is again free.

The feeding and ejecting device for a piece to be machined in accordance with the invention, comprising a conveyor belt and ejecting means is characterized in that a brake member is arranged at the end of the conveyor belt for transferring the piece from a first working position to a second working position and directly in front of the second working position. The brake member cooperates with a guide so that the piece occupies a defined position in front of the second working position and is held in said position by a clamping member after the braking force has been released.

The invention will now be described more fully with reference to one embodiment shown in the drawing, in which.

Figure 1:
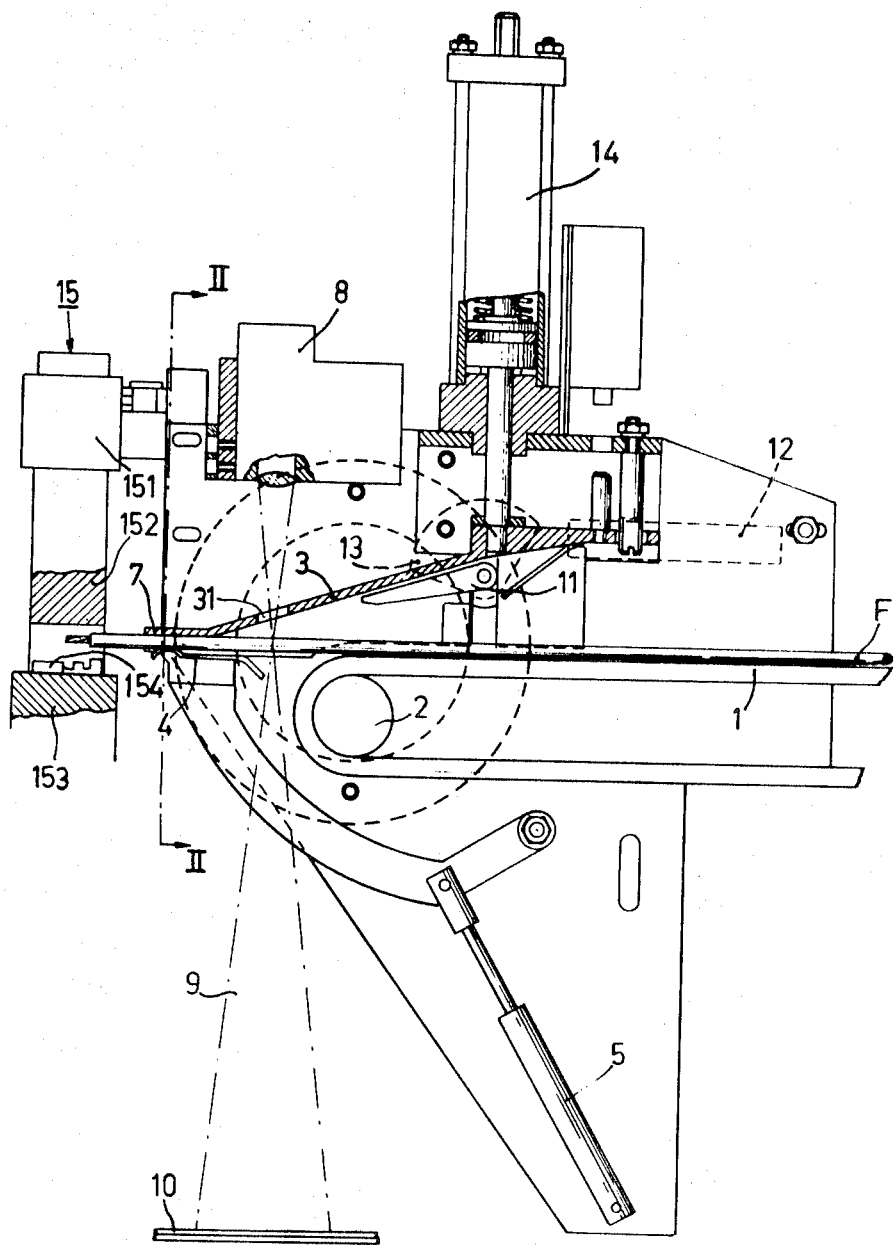
FIG. 1 is a vertical longitudinal sectional view of the device.
Figure 2:
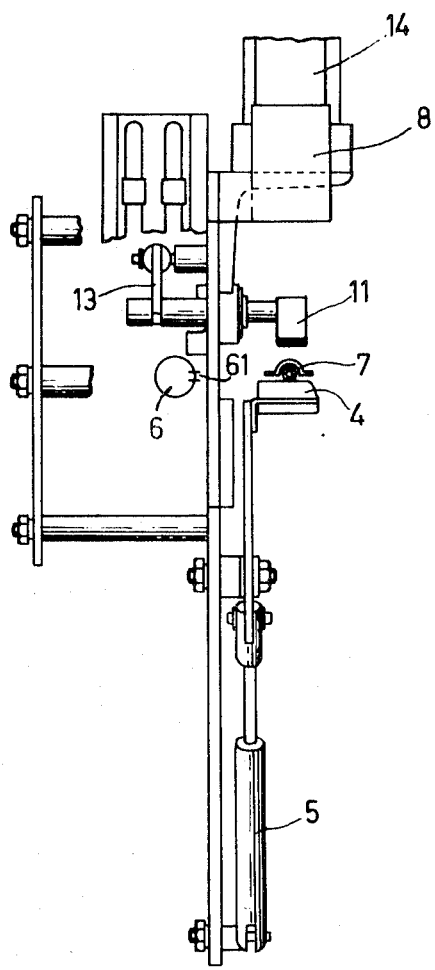
FIG. 2 is a perpendicular cross sectional view of said device taken on the line II—II in FIG. 1.

The device according to the invention, is intended for the feed of electric wires from a cutting and stripping machine to a clip inserting press.

The wire F, cut to the desired length, and having one end stripped, the other end to be stripped subsequently, is fed by a conveyor belt 1, driven by a continuously rotating roller 2 arranged on the stub shaft of a direct-current motor, the speed of which is controlled by a known, static regulator. The speed is adjusted in accordance with the length and the diameter of the wire.

The wire F is fed into a guide 3 and is then braked by a brake shoe 4. This brake shoe is actuated by a compressed-air cylinder 5, the pressure of which is controlled very accurately by a manometer and a precision cock. This control is carried out so that the wire is passed invariably by the same length into the sleeve of a clamp 154, which has to be fastened. The wire guide 3 has an exchangeable end portion 7. The lateral dimension of the passage of the guide is equal to that of the wire to be machined, whereas its height is slightly smaller, so that the brake shoe 4 can become operative.

The clamp 154 is arranged on an anvil 153 of an insertion press 15 directly at the end of the brake shoe 4 and is located slightly beneath the end of the wire F so that it cannot abut against the sleeve. The neck of the clamp comprises two rows of teeth; the teeth nearest the end of the neck clamp the unstripped wire portion near the stripped end so that the assembly is mechanically fixed. The other teeth serve for establishing an electric contact with the stripped wire portion. It is therefore necessary to position the wire end with great accuracy in the clamp in order to obtain adequate mechanical rigidity and good electric contact. If the wire has penetrated too far into the clamp, the electric contact may be poor, since then the two groups of teeth embrace either the insulating layer of the wire or the stripped wire ends in an undesirable manner. If the wire has not penetrated far enough, the electric contact is satisfactory, but since the mechanical rigidity of the stripped wire ends is slight, the wire is likely to break off during use.

The pressure control of the air fed to the cylinder 5 acts upon the pressure exerted by the brake shoe 4 on the wire F and controls with great accuracy the insertion of the wire into the neck of the clamp 154.

The control of the braking effect is complementary to the speed control of the conveyor belt. The shorter and the thinner the wire, the higher has to be the speed of the belt in order to insert the wire with sufficient speed into the guide 3 so that it may occupy the defined position in the end portion 7 of the guide. The brake shoe 4 has to operate so that the wire is arrested in the desired position.

When entering the guide 3 and just in front of the brake shoe 4 the wire passes by a detection system 8 comprising a light source, an optical system and a photoelectric cell. The light beam 9 from the source 8 passes through the guide 3 via a window 31 and is reflected from a mirror 10, which projects the beam along the same path to a small mirror near 8, which projects the light onto the cell. When the light beam is interrupted, the cell actuates an electric switch which starts the clamping cycle.

The insertion press 15 is a known automatic machine receiving pins or clips from supply reels. This press, which comprises a die 152 driven by a pneumatic pressure cylinder 151, has a constant pressing depth and may be controlled by any device. In this particular case an electric switch connected ot the compressed-air circuit controls the cylinder 151 of the insertion press 15.

The device according to the invention cooperates as follows with the insertion press. After the detection of the wire the clamping member 11 is lowered and it holds the wire so that it cannot move during the clamping operation. The downward movement of the clamping member 11 is controlled by the pressure cylinder 12 via a cam 13. At the end of the trajectory of the pressure cylinder 12 the brake shoe 4 is lowered and the insertion press 15 is actuated.

The brake shoe 4 is opened to insert the wire into the neck of the clamp 154 without deformation of the wire. Simultaneously with the downward movement of the die 152 of the press 15 the guide 3 is moved downwards by the cylinder 14.

When the clamp grips the wire, the upward movement of the die 152 controls the upward movement of the guide 3 so that the clamping member 11 is lifted.

During the period required for holding the clamp 154 to deform the neck, the guide 3 is lifted and the jet nozzle 6 produces through openings 61 a short pulse of compressed air for a time equal to that required for the upward movement of the die 152 and the guide 3. When the clamp 154 is free of the insertion press, the wire is thrown into a collecting trough arranged parallel to the jet nozzle 6. The jet nozzle 6 has a length equal to the maximum length of wire to be treated.

The effective length of the jet nozzle 6 is adapted to the length of wire by means of rings (not shown) having an inner diameter slightly larger than the outer diameter of the jet nozzle 6. These rings are set in front of a given number of openings 61 of the jet nozzle 6 so that only an effective length equal to that of the wire is left.

Figure 3:
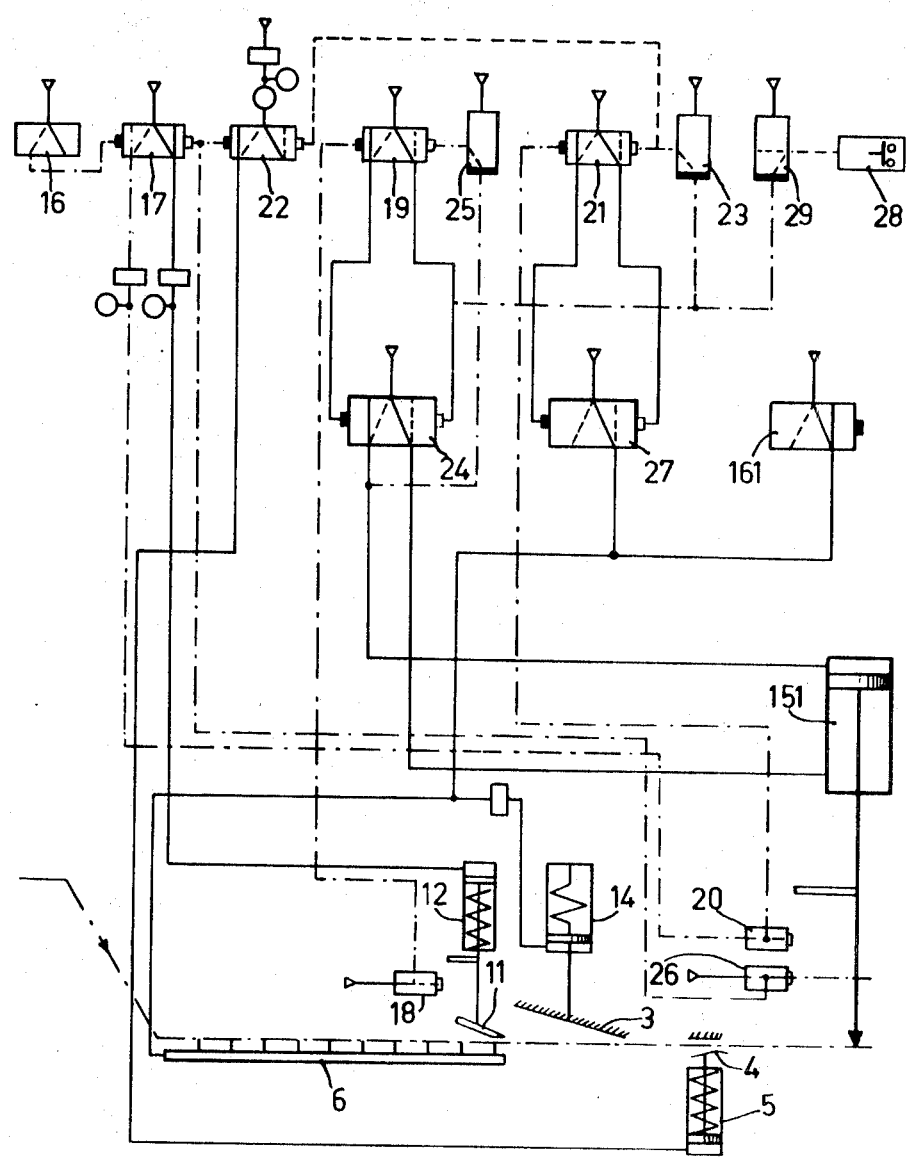
FIG. 3 is a diagram of the pneumatic control.

FIG. 3 illustrates diagrammatically the control of the various consecutive operations for feeding and ejecting the wire by means of a pneumatic logic system, which operates as follows:

The cycle is assumed to be at the initial stage, i.e. the guide 3 is in the guiding position, the brake shoe 4 is in the topmost or braking position, the clamping member 11 is out of operation, the die 152 is at the upper dead point. When the wire appears in front of the cell of the detection system 8 (FIG. 1), the electric switch 16 becomes operative, which causes pressure to pass via the distributor 17 to the cylinder 12 so that the clamping member 11 is lowered. When the clamping member 11 is in the operative position, a member connected herewith closes the outlet 18. Thus the pneumatic relay 19 becomes operative and controls the supply of compressed air via the delay and distribution relays 25 and 24 respectively to the cylinder 151 of the insertion press 15, the die 152 being thus lowered.

Two outlets 20 and 26, relatively shifted over a slight distance, can be closed during the downward movement of the die 152. When the outlet 20 is closed, the relay 21 becomes operative and produces via the distributor 27 and the pressure cylinder 14 the downward movement of the guide 3 and the operation of the jet nozzle 6 and loosens the brake shoe 4 via the relay 22 and controls the upward movement of the die 152 via the delay relay 23 and the distributing relay 24. When the outlet 26 is closed, the clamping member 11 is lifted via the distributor 17 and the pressure cylinder 12.

During the upward movement of the die 152 of the insertion press 15, the whole operation is set back in the initial state by the release of the outlets 20 and 26 so that a new cycle can be started.

This feeding and ejecting device according to the invention permits of designing numerous combinations of automatic machines. The ejection of the pieces in a direction transverse of the conveyer belt contributes to the regular arrangement thereof in a trough so that it is possible to have a further conveying device pick them up for further conveyance without the need for intermediate manipulations.

We claim:

1. A method of feeding and ejecting an object to be clamped and formed comprising the steps of advancing the object from a first working position to a second working position by means of an endless conveyor belt of variable speed, setting the object in the second working position by means of a movable guide, applying a controllable braking force on the object by means of a braking member and said guide so as to accurately position the object for the clamping and forming operation, tightly holding the object by a clamping member simultaneously at the elimination of the braking force, at the release of the guide and at the downward movement of the object to a tool, and ejecting the object immediately after release of the clamping member, the object being thus free of the tool.

2. A method as claimed in claim 1 wherein advancing the object by the conveyor belt is carried out at an accurately constant speed in accordance with the mass of the object.

3. A method as claimed in claim 1 wherein the object is accurately braked in accordance with the speed of the belt and the mass of the object.

4. A method as claimed in claim 1, wherein the positioning of the object in the position required for the clamping and forming operation produces simultaneously the downward movement of the clamping member, the release of the braking force and within a time lag the performance of the operation of clamping and forming, termination of the operation brings about the upward movement of the guide, the supply of the pressurized medium and the upward movement of the clamping member.

5. A device for carrying out the method claimed in claim 1 comprising a conveyor belt for advancing the object to be worked on from a first working position to a second working position and directly in front of the second working position, a guide member for guiding the object to a given position in front of the second working position, a brake member arranged at the end of said conveyor belt for cooperation with the guide member so as to set the object in position, a clamping member for holding the object tightly after the brake member has been released, and means for ejecting the object after being worked on.

6. A device as claimed in claim 5 wherein the conveyer belt is driven via a roller arranged on the stub shaft of a motor having a speed control.

7. A device as claimed in claim 5 wherein the brake member is formed by part of the guide and by a brake shoe adapted to be actuated by a hydraulic cylinder.

8. A device as claimed in claim 5, wherein the guide member is formed by a body having an ample guide space and an accurately positioning end piece, which can be exchanged in accordance with the dimensions of the object.

9. A device as claimed in claim 8 wherein said end piece is provided with a groove having a width substantially equal to that of the object and a depth smaller than the dimension of the object.

10. A device as claimed in claim 5 wherein the clamping member is formed by a finger which can be actuated directly or indirectly by a hydraulic cylinder.

11. A device as claimed in claim 5 wherein the ejecting means is formed by a tube having apertures and a compressed-air supply communicating therewith.

12. A device as claimed in claim 11 wherein said tube is provided with slidable rings, which can close given apertures for varying the effective length of the tube.

References Cited

UNITED STATES PATENTS 3,455,006   7/1969   Reem et al. _____ 29—203 DT

THOMAS H. EAGER, Primary Examiner